(12) United States Patent
Bhaidasna et al.

(10) Patent No.: US 10,821,374 B2
(45) Date of Patent: Nov. 3, 2020

(54) INCREASING ACCURACY OF MEASUREMENTS USING MUD RETORTS BY MAXIMIZING RECOVERY OF VAPORS

(71) Applicant: Halliburton Energy Services, Inc., Houston, TX (US)

(72) Inventors: Ketan Chimanlal Bhaidasna, Houston, TX (US); Richard Gary Morgan, Channelview, TX (US); Harmeet Singh Jammu, Sachse, TX (US); Andrew David Vos, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 240 days.

(21) Appl. No.: 15/355,854

(22) Filed: Nov. 18, 2016

(65) Prior Publication Data

US 2018/0140968 A1 May 24, 2018

(51) Int. Cl.
*B01D 5/00* (2006.01)
*E21B 21/06* (2006.01)
(Continued)

(52) U.S. Cl.
CPC .............. *B01D 5/009* (2013.01); *B01D 3/02* (2013.01); *B01D 5/0048* (2013.01);
(Continued)

(58) Field of Classification Search
CPC ........ B01D 5/009; B01D 5/0048; B01D 3/02; E21B 21/067; E21B 49/005; E21B 49/02; G01N 25/14; G01N 33/241; G01V 9/00
See application file for complete search history.

(56) References Cited

U.S. PATENT DOCUMENTS 2,591,737 A * 4/1952 Souther, Jr. ........... E21B 49/005
250/255
3,084,690 A * 4/1963 Jones, Jr. ............ A61M 1/0001
215/309

(Continued)

FOREIGN PATENT DOCUMENTS

CN          201464467 U        5/2010
GB             827395      *   2/1960 ............... B01D 3/32

OTHER PUBLICATIONS

IEEE. (2011). Glass Materials Information, GlobalSpec Engineering 360. Accessed Oct. 1, 2018 at https://www.globalspec.com/learnmore/materials_chemicals_adhesives/ceramics_glass_materials/glass_materials (Year: 2011).*

*Primary Examiner* — Jonathan Miller
*Assistant Examiner* — Gabriel E Gitman
(74) *Attorney, Agent, or Firm* — Tenley Krueger; C. Tumey Law Group PLLC

(57) ABSTRACT

A mud retort assembly includes a retort that heats a fluid and thereby generates vapors, a condenser in fluid communication with the retort to at least partially condense the vapors and thereby generate a liquid, a condensate collector that receives the liquid and residual vapors via an outlet pipe of the condenser, and a collector plug having a frustoconical body that extends partially into the condensate collector at an opening to the condensate collector. The collector plug defines a central aperture that receives the outlet pipe and has an annular flange extending radially outward from the frustoconical body to rest on the condensate collector at the opening.

15 Claims, 7 Drawing Sheets

(51) Int. Cl.
  *B01D 3/02* (2006.01)
  *E21B 49/00* (2006.01)
  *G01N 25/14* (2006.01)

(52) U.S. Cl.
  CPC .......... *E21B 21/067* (2013.01); *E21B 49/005* (2013.01); *G01N 25/14* (2013.01)

(56) References Cited

U.S. PATENT DOCUMENTS

| | | | |
|---|---|---|---|
| 3,109,782 A | 11/1963 | Nathan | |
| 3,195,779 A * | 7/1965 | Nicko | B67D 1/04 222/129.1 |
| 3,441,481 A * | 4/1969 | Tobey | G01N 25/14 202/169 |
| 3,894,578 A * | 7/1975 | Stoy | B01D 5/0012 165/133 |
| 4,331,514 A * | 5/1982 | Bauer | B01D 1/0017 202/181 |
| 4,367,440 A * | 1/1983 | Mazzagatti | G01N 33/2823 324/445 |
| 4,389,313 A * | 6/1983 | Charney | B01D 15/22 210/198.2 |
| 4,771,802 A * | 9/1988 | Cristiano | F16K 31/363 137/102 |
| 5,117,548 A * | 6/1992 | Griffith | B23P 19/025 29/426.1 |
| 5,453,256 A * | 9/1995 | Rumpf | B01D 1/0017 422/211 |
| 5,519,214 A * | 5/1996 | Houwen | G01N 23/2206 250/256 |
| 6,223,556 B1 * | 5/2001 | De Keuster | F25B 39/04 165/132 |
| 8,997,554 B2 | 4/2015 | Murphy | |
| 2007/0149022 A1 * | 6/2007 | Kobylecki | G01N 25/14 439/188 |
| 2010/0139914 A1 * | 6/2010 | Tehrani | G01N 33/241 166/250.17 |
| 2013/0277113 A1 * | 10/2013 | Murphy | G01N 1/4022 175/46 |

\* cited by examiner

INCREASING ACCURACY OF MEASUREMENTS USING MUD RETORTS BY MAXIMIZING RECOVERY OF VAPORS

BACKGROUND

Subterranean drilling operations in the oil and gas industry typically use a drilling fluid (alternately referred to as "mud") to help drill wellbores. The drilling fluid serves several purposes, including providing hydrostatic pressure that prevents formation fluids from entering into the wellbore, cooling and cleaning the drill bit used to drill the wellbore, circulating drill cuttings and debris out of the drilled wellbore, and suspending the drill cuttings while drilling is paused or while the drilling assembly is brought in and out of the wellbore. It is often desired to analyze the drilling fluid to determine percentages of water, oil, and solids contained therein. Such analyses are commonly carried out using a mud retort.

A mud retort is a mud distillation unit that operates by heating a drilling fluid sample at sufficient temperature to vaporize contained liquids, including water, oil, or synthetics. The vapors are condensed using a condenser and collected in an adjacent graduated cylinder, after which the specific volumes can be measured directly in the graduated cylinder. However, some of the condensate is still in the vapor phase after exiting the condenser and escapes to the atmosphere. This loss of condensate can adversely affect accuracy in measuring of the amount of water, oil, and solid contained in the drilling fluid.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Embodiments disclosed herein are directed to drilling fluid testing systems and methods and, more particularly, to an improved mud retort system that includes a collector plug that helps maximize recovery of condensates and thereby increases accuracy of measuring water, oil, and solids content in a drilling fluid sample.

As described herein, a collector plug can be used to help prevent the escape of condensates in a mud retort system. A tapering outer surface allows the collector plug to be used with condensate collectors (e.g., graduated cylinders) having different sized openings. In addition to minimizing escape of condensates, the collector plug also minimizes the pressure differential across the collector plug and prevents the collector plug from being dislodged during operation. Lastly, the collector plug provides a low cost solution to increasing the accuracy of measurement by reducing the variation in the measurements and thereby increasing the repeatability.

Figure 1A:
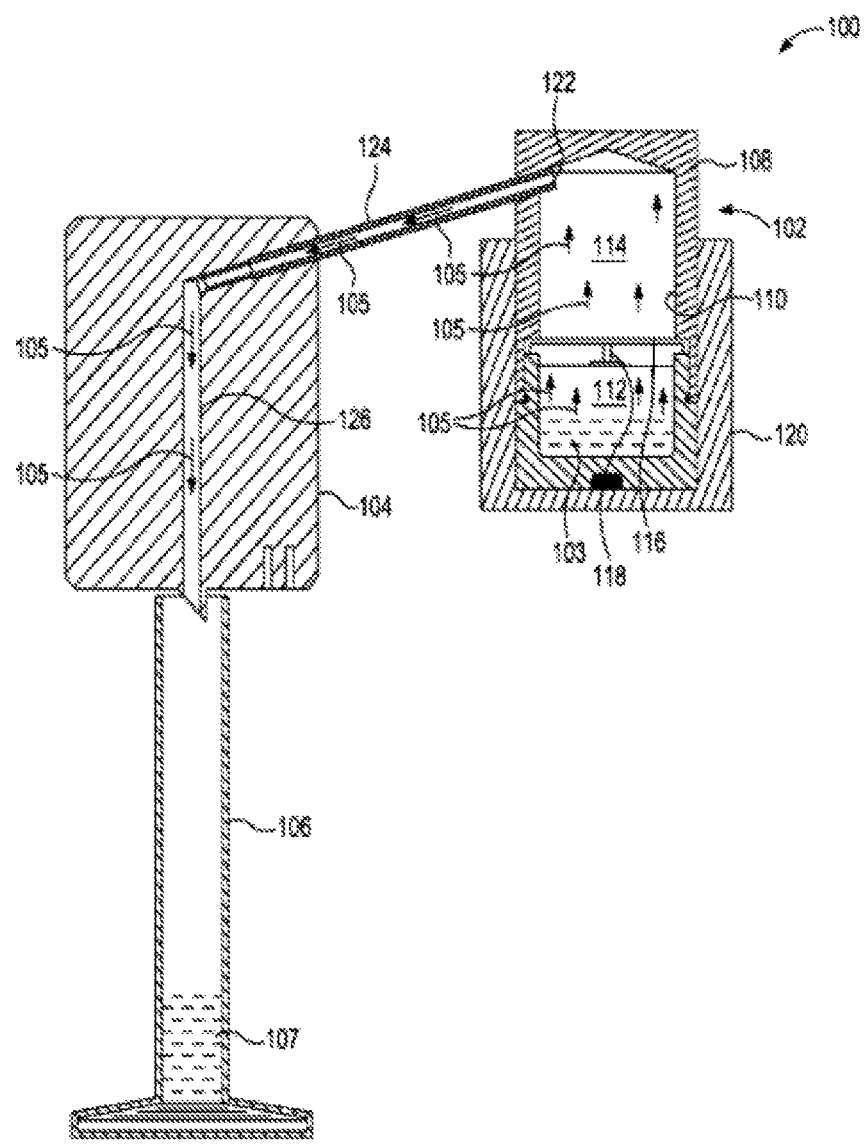
FIG. 1A illustrates a vertical cross section of an example mud retort assembly for solid-liquid separation and analysis of drilling fluids.

FIG. 1A illustrates a vertical cross section of an example mud retort assembly 100 for solid-liquid separation and analysis of drilling fluids. The mud retort assembly 100 may include a retort 102, a condenser 104, and a condensate collector 106. The retort 102 may include a retort body 108 having a generally cylindrical outer surface and defining therein an inner chamber 110 that is separated into a bottom chamber 112 and a top chamber 114 by a disc-shaped plate 116. The plate 116 may define therein a central orifice 118 providing fluidic communication between the bottom chamber 112 and the top chamber 114.

The mud retort assembly 100 may further include a heating element 120 configured to receive and at least partially enclose the retort body 108. As illustrated, the heating element 120 may be in the shape of an open-ended cylinder that may receive the lower portion of the retort body 108. However, other configurations of the heating element 120 are possible as long as a sufficient amount of heat can be imparted to a drilling fluid contained in the bottom chamber 112. For example, the heating element 120 may be embedded within the retort body 108 adjacent the bottom chamber 112.

During operation, a drilling fluid 103 may be introduced into the inner chamber 110 and reside primarily in the bottom chamber 112. The heating element 120 may be configured to heat the drilling fluid 103 to a predetermined temperature, such as from around 100° C. (212° F.) to around 300° C. (572° F.), causing at least a portion of the drilling fluid 103 to vaporize. The resulting vapors 105 may escape the bottom chamber 112 and enter the top chamber 114 via the central orifice 118. In an example, a wad of steel wool (or the like) may be placed in the central orifice 118 to prevent drilling fluid 103 in the bottom chamber 112 from inadvertently migrating into the top chamber 114.

The vapors 105 may escape the retort 102 through a vent 122 defined in the retort body 108 that places the top chamber 114 in fluid communication with the exterior. The vent 122 may be coupled to the condenser 104 via a connector 124 that places the condenser 104 in fluid communication with the inner chamber 110 of the retort body 108.

The condenser 104 may be or include any type heat exchanger known in the art for condensing a vapor into a liquid state. The condenser 104 may be kept at a lower temperature than the vapors 105, which may have a temperature around the temperature of the heated drilling fluid 103. In certain embodiments, for example, the condenser 104 may be kept at near ambient temperature. In other embodiments, the condenser 104 may be kept below ambient temperature using a cooler (not shown). The vapors 105 may be conveyed within an internal passage 126 defined within the condenser 104 and, while traversing the internal passage 126, may condense into a liquid form. The condensed liquid 107 may then be discharged from the condenser 104 and collected in the condensate collector 106 located adjacent the condenser 104. In some embodiments, the condensate collector 106 may be a graduated cylinder made of a clear material, such as glass or plastic, such that the volume of the condensed liquid 107 collected is visible through the condensate collector 106. The volume of the condensed liquid 107 may be measured to determine, for example, the oil-to-water ratio of the drilling fluid.

Figure 1B:
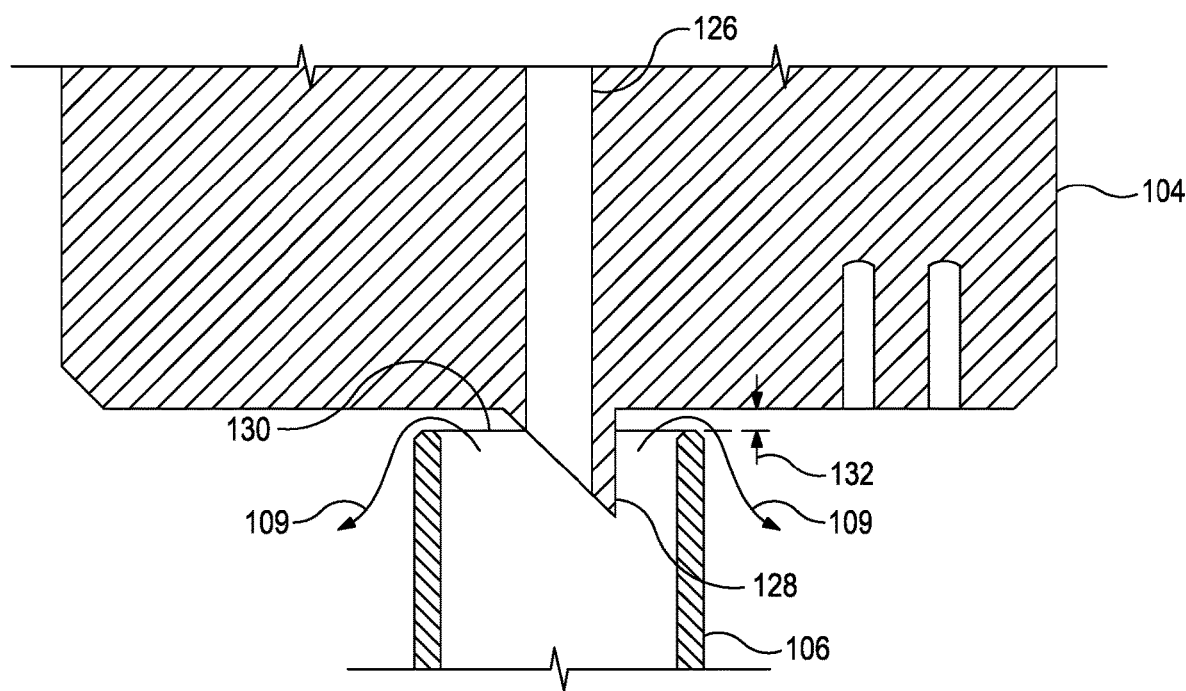
FIG. 1B is an enlarged cross-sectional view of the interface between the condenser and the condensate collector.

FIG. 1B is an enlarged cross-sectional view of the interface between the condenser 104 and the condensate collector 106. As illustrated, an outlet pipe 128 extends from the internal passage 126 and extends a short distance into the condensate collector 106 via an opening 130 of the condensate collector 106. The condensate collector 106 and the condenser 104 may both be held together in place via a holding or retaining mechanism (not illustrated), or the condensate collector 106 may be placed on a table underneath the condenser 104. A gap 132 may be defined between the condensate collector 106 and the condenser 104 adjacent the opening 130. While the gap 132 may facilitate easy switching between different condensate collectors, the gap 132 may also permit any residual vapors 109 (e.g., vapors that do not condense in the condenser 104) to escape the condenser 104 or the condensate collector 106. Specifically, the vapors 105 (FIG. 1A) may enter the condenser 104 with a certain velocity that may depend on many factors including, but not limited to, the composition of fluid being heating in the retort 102 (FIG. 1A) and the rate of evaporation of the fluid. Because of their velocity, the condenser 104 may not be able to fully condense all the vapors 105 passing therethrough. This may result in the residual vapors 109 that may escape into the atmosphere via the gap 132. Due to the loss of residual vapors 109, incorrect volumes of oil and water will be collected in the condensate collector 106, which may result in erroneous measurements.

Figure 2A:
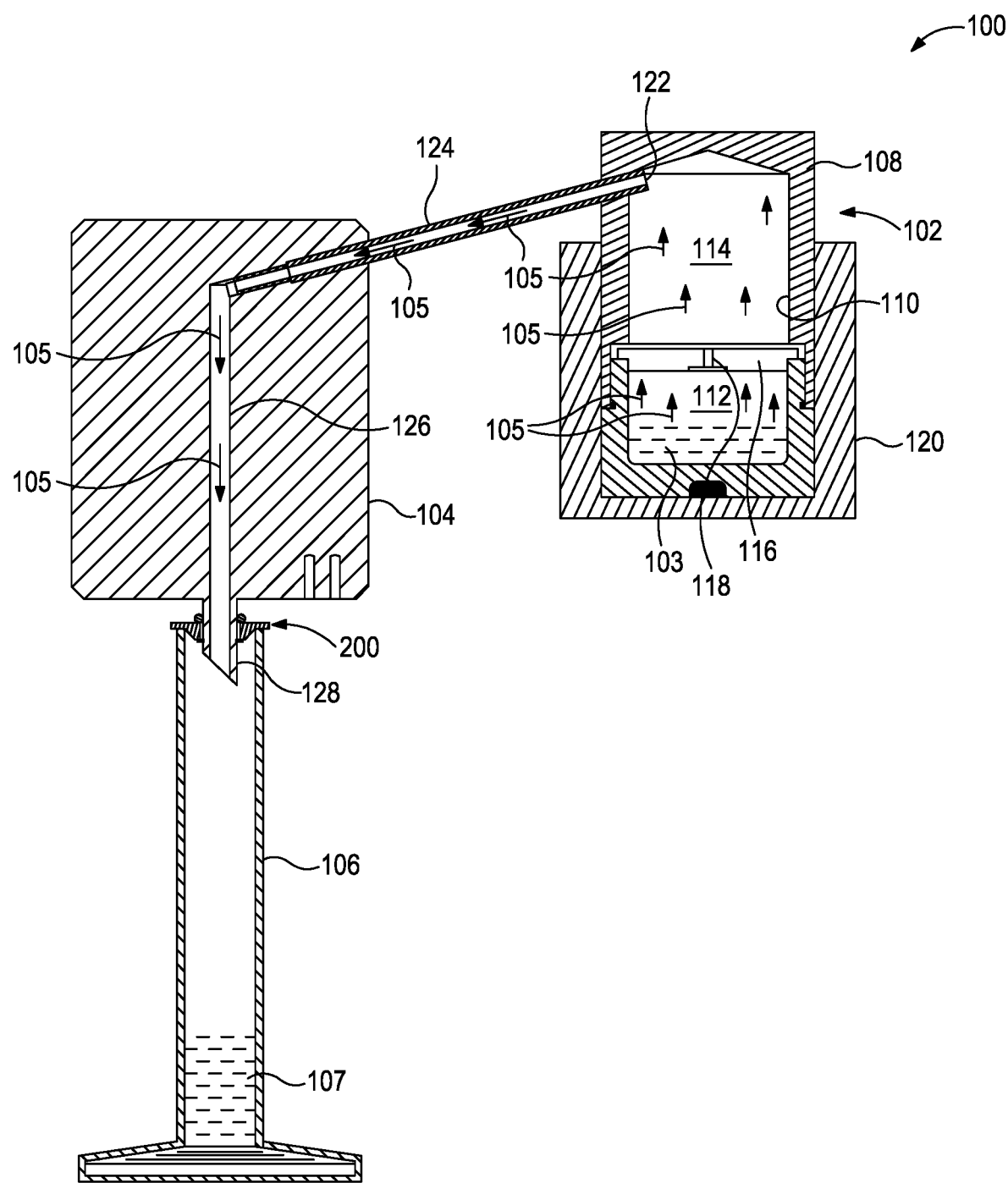
FIG. 2A illustrates another embodiment of the mud retort assembly of FIG. 1A including an example collector plug, according to one or more embodiments disclosed.

FIG. 2A illustrates another embodiment of the mud retort assembly 100 of FIG. 1A including an example collector plug 200, according to one or more embodiments disclosed. The collector plug 200 may be sized and otherwise configured to be received in the opening 130 (FIG. 1B) of the condensate collector 106 such that a portion of the collector plug 200 extends at least partially into the condensate collector 106 to prevent or substantially prevent the residual vapors 109 (FIG. 1B) exiting the condenser 104 from escaping into the surrounding environment. Specifically, the collector plug 200 reduces the potential of the residual vapors 109 received from the condenser 104 from escaping to the atmosphere via the gap 132 (FIG. 1B).

Figure 2B:
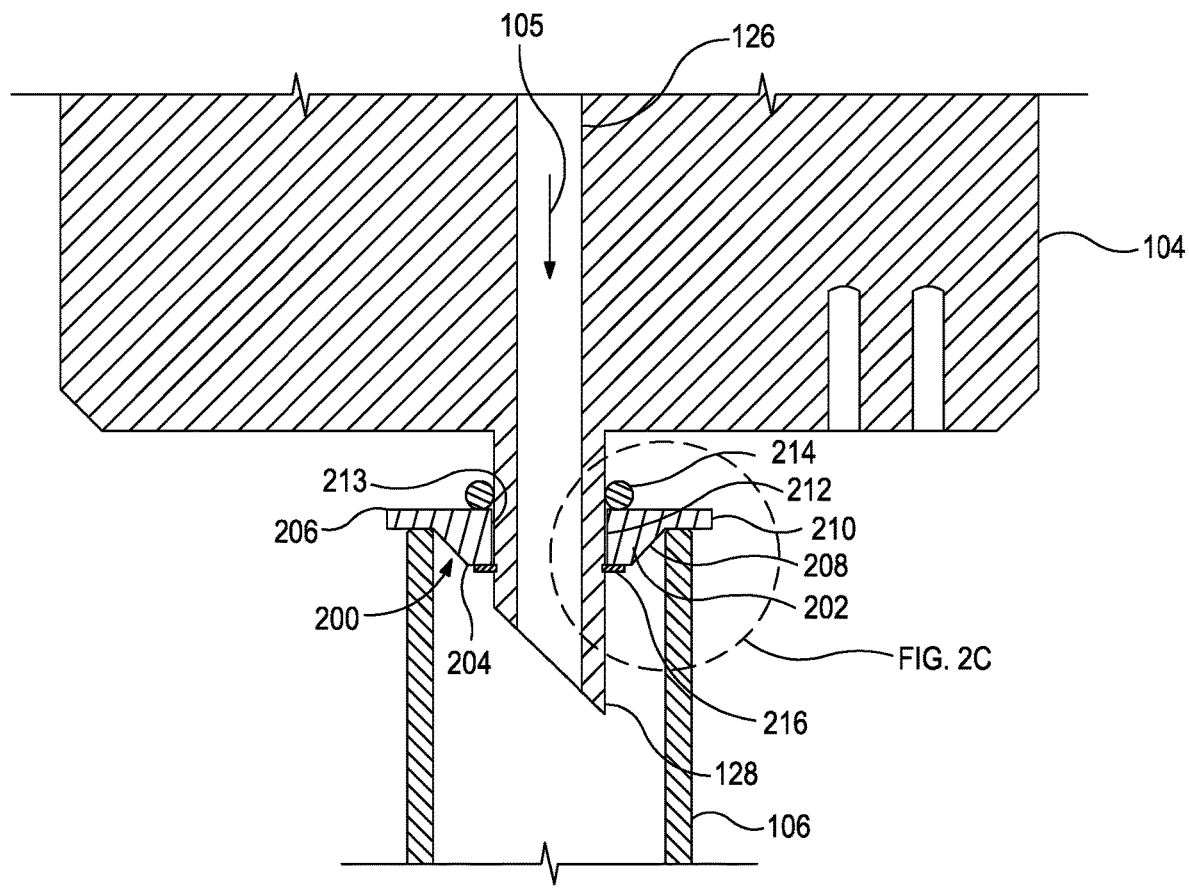
FIG. 2B is an enlarged cross-sectional view of the interface between the condenser and the condensate collector with the addition of the collector plug.

FIG. 2B is an enlarged cross-sectional view of the interface between the condenser 104 and the condensate collector 106 with the addition of the collector plug 200. As illustrated, the collector plug 200 may have a generally frustoconical body 202 having a first or "bottom" end 204 and a second or "top" end 206 opposite the first end 204. As used herein, the term frustoconical and any variation thereof, refer to a shape of a frustum of a cone. A frustum of a cone (also referred to as a conical frustum) is the portion of a cone that remains after the upper part of the cone has been cut off by a plane parallel to its base.

The body 202 defines a generally conical outer surface 208 that tapers from the second end 206 toward the first end 204. The body 202 also includes an annular flange 210 that extends radially outward at the second end 206. In some embodiments, as illustrated, the collector plug 200 may rest within the opening 130 by having the annular flange 210 engage the opening 130. Alternatively, in other embodiments, wherein the annular flange 210 is absent or wherein the frustoconical portion of the body 202 is larger than the size (e.g., diameter) of the opening 130, the collector plug 200 may rest within the opening 130 by having a portion of the frustoconical body 202 engage the opening 130. In some embodiments, as illustrated, the body 202 and the annular flange 210 are integrally formed as a single monolithic structure. In other embodiments, however, the body 202 and the annular flange 210 may comprise independent, coupled structures that form the collector plug 200.

The body 202 defines a central aperture 212 extending axially through the body 202 between the first and second ends 204, 206. The central aperture 212 may exhibit a generally circular cross-section having a diameter large enough to receive the outlet pipe 128 of the condenser 104. The outlet pipe 128 may have a length sufficient to extend through the central aperture 212 and a short distance into the condensate collector 106.

The collector plug 200 may be made of a corrosion-resistant material and may exhibit a melting point greater than about 300° C. (572° F.) such that the collector plug 200 is undamaged by the vapors comprising superheated oil and steam. Example materials for the collector plug 200 include, but are not limited to, steel, brass, copper, aluminum, bronze, and alloys thereof. In addition, the collector plug 200 is sufficiently heavy to prevent the pressure developed in the condensate collector 106 (e.g., due to accumulation of the vapors in the condensate collector 106) from dislodging the collector plug 200. Generally, the collector plug 200 may be heavier than the fluids under test being heated in the retort 102.

Residual vapors 109 (FIG. 1B) that enter the condensate collector 106 via the outlet pipe 128 contact the collector plug 200 and coalesce in liquid form to be collected in the condensate collector 106. In some embodiments, the bottom of the collector plug 200 (i.e., the surfaces of the collector plug 200 disposed within the condensate collector 106) may be coated with a hydrophobic material, such as TEFLON® and the like, to prevent the condensed liquid from sticking to the collector plug 200. In other embodiments, the bottom of the collector plug 200 may be polished to reduce the propensity for liquids to adhere to the collector plug 200. In such embodiments, the bottom of the collector plug 200 may be polished, for example, to a surface finish of about 40 micro-inches or better. Further, the conical shape of the outer surface 208 encourages any condensed liquid to release from the bottom of the collector plug 200 and flow into the condensate collector 106. As a result, the amount of liquid that can be recovered is maximized.

Figure 2C:
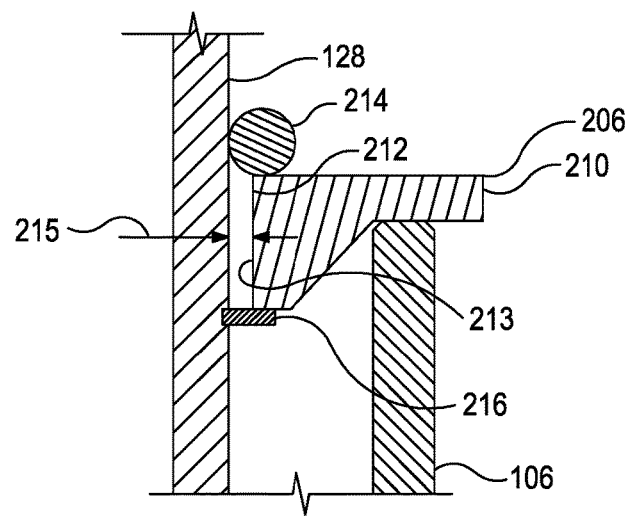
FIG. 2C is an enlarged view of the encircled portion indicated in FIG. 2B.

FIG. 2C is an enlarged view of the encircled portion indicated in FIG. 2B. As illustrated, in order to facilitate easy insertion and removal of the outlet pipe 128 from the central aperture 212, the inner diameter of the central aperture 212 may be larger than the outer diameter of the outlet pipe 128 such that a clearance (or space) 215 is defined between the outlet pipe 128 and an inner wall 213 of the central aperture 212 when the outlet pipe 128 is positioned in the collector plug 200.

Referring back to FIG. 2B and with continued reference to FIG. 2C, in an embodiment, and as illustrated, to minimize the loss of vapors via the clearance 215, the clearance 215 may be sealed using one or more sealing elements 214 (one shown). As illustrated, the sealing element 214 may be disposed about the outlet pipe 128 and rest on the second end 206 of the collector plug 200. The sealing element 214 may be made of a variety of materials including, but not limited to, an elastomeric material, a metal, a composite, a rubber, a ceramic, any derivative thereof, and any combination thereof. In some embodiments, and as illustrated, the sealing element 214 may comprise one or more O-rings or the like.

It should be noted that the sealing element 214 (and, therefore, the collector plug 200) may not produce a fluid tight seal. The sealing element 214 may permit a small, negligible amount of vapors to escape the condensate collector 106 through the clearance 215. Moreover, a small amount of vapors may also be able to escape the condensate collector at the interface between the annular flange 210 and the top of the condensate collector 106 at the opening 130 (FIG. 1B). This may prove advantageous in reducing the pressure gradient across the collector plug 200 and preventing the collector plug 200 from dislodging from the condensate collector 106 due to buildup of pressure within the condensate collector 106.

In some embodiments, a retaining ring 216 may be releasably coupled or otherwise attached to the collector plug 200 at the first end 204 adjacent to the central aperture 212. In an example, the retaining ring 216 may be a snap ring or the like that may be secured to the outlet pipe 128 in a groove (not explicitly illustrated) defined therein. The retaining ring 216 may hold the collector plug 200 in place on the outlet pipe 128, for example, in the absence of the condensate collector 106.

Figure 2D:
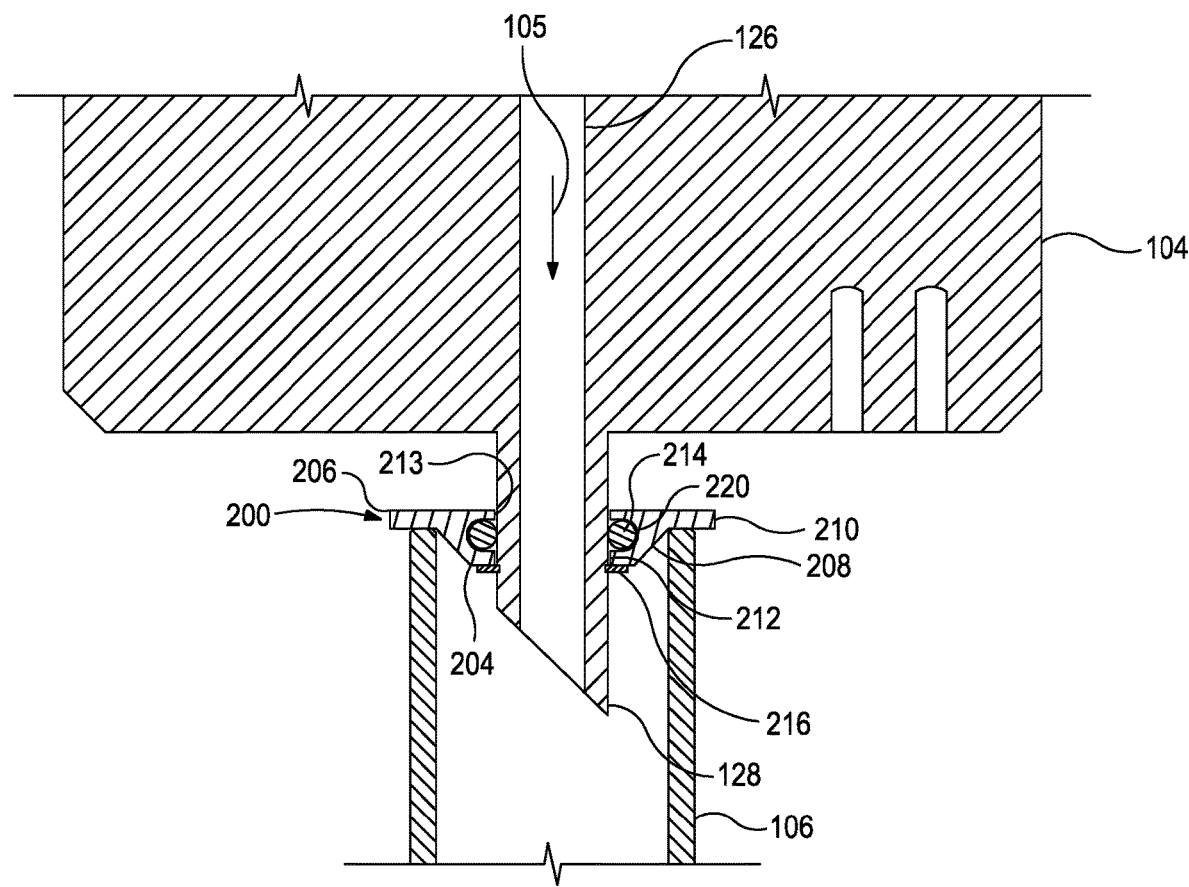
FIG. 2D illustrates a cross sectional view of another embodiment of the collector plug of FIG. 2A, according to the present disclosure.

FIG. 2D illustrates a cross-sectional view of another embodiment of the collector plug 200, according to the present disclosure. As illustrated, one or more annular grooves 220 (one shown) may be defined in the inner wall 213 of the central aperture 212, and the sealing element 214 may be located in the annular groove 220 to seal the clearance 215 (FIG. 2C) between the outlet pipe 128 and the inner wall 213 of the central aperture 212. With such an arrangement, the compression of the sealing element 214 may be controlled and a quality of the seal provided by the sealing element 214 may be improved.

Figure 3A:
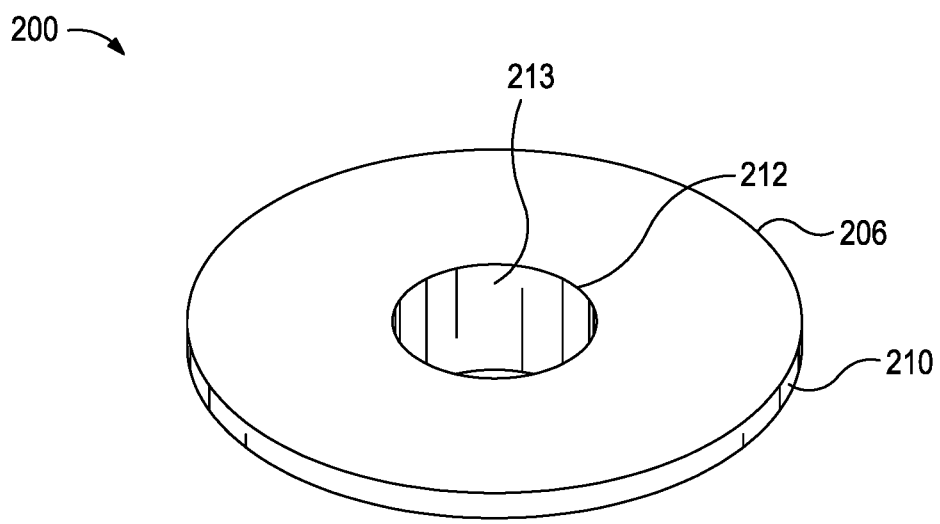
FIG. 3A illustrates a top isometric view of the collector plug in FIGS. 2A-2C.
Figure 3B:
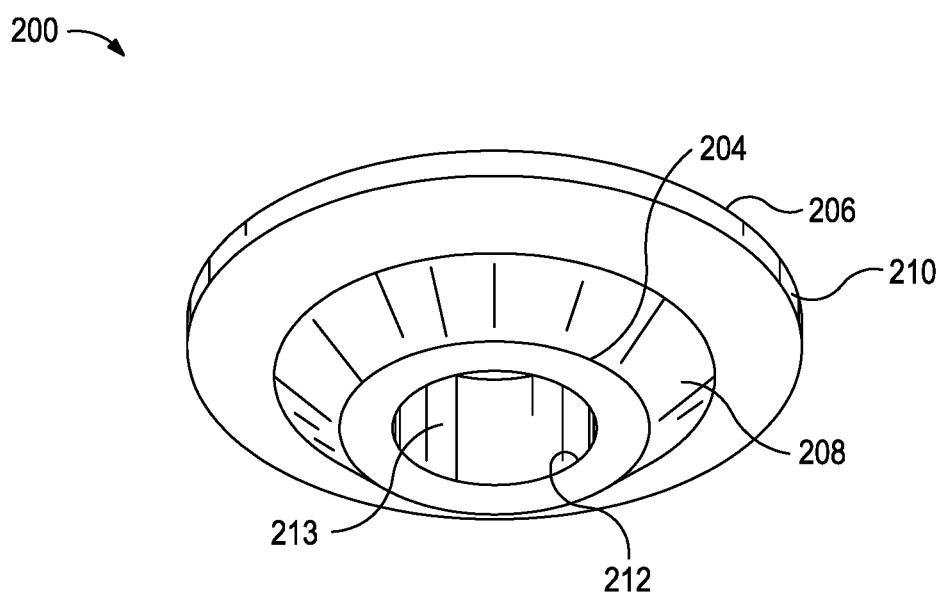
FIG. 3B illustrates a bottom isometric view of the collector plug in FIGS. 2A-2C.

FIG. 3A illustrates a top isometric view of the embodiment of the collector plug 200 in FIGS. 2A-2C, and FIG. 3B illustrates a bottom isometric view of the embodiment of the collector plug 200 in FIGS. 2A-2C.

Figure 4A:
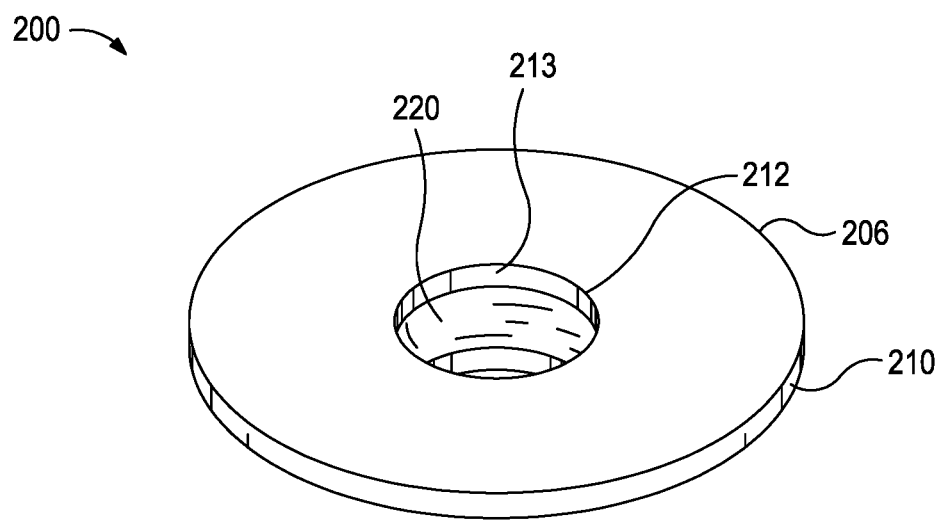
FIG. 4A illustrates a top isometric view of the collector plug in FIG. 2D.
Figure 4B:
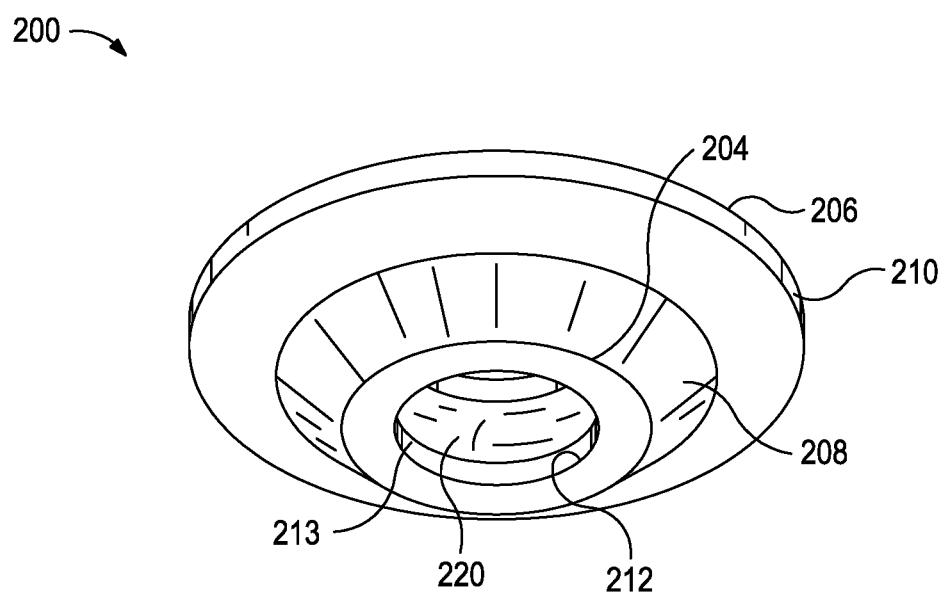
FIG. 4B illustrates a bottom isometric view of the collector plug in FIG. 2D.

FIG. 4A illustrates a top isometric view of the embodiment of the collector plug 200 in FIG. 2D, and FIG. 4B illustrates a bottom isometric view of the embodiment of the collector plug 200 in FIG. 2D. As illustrated, the annular groove 220 may be defined in the inner wall 213 of the central aperture 212 for locating the sealing element 214 (FIG. 2D).

Embodiments disclosed herein include:

A. A mud retort assembly, comprising a retort that heats a fluid and thereby generates vapors; a condenser in fluid communication with the retort to at least partially condense the vapors received from the retort and thereby generate a liquid; a condensate collector that receives the liquid and residual vapors via an outlet pipe of the condenser; and a collector plug having a frustoconical body that extends partially into the condensate collector at an opening to the condensate collector and defining a central aperture that receives the outlet pipe, the collector plug further having an annular flange extending radially outward from the frustoconical body to rest on the condensate collector at the opening.

B. A method, comprising heating a fluid within a retort and thereby generating vapors from the fluid; condensing at least a portion of the vapors into a liquid using a condenser in fluid communication with the retort; receiving the liquid and any residual vapors in a condensate collector via an outlet pipe of the condenser; and mitigating escape of the residual vapors from the condensate collector with a collector plug positioned at an opening to the condensate collector, the collector plug having a frustoconical body that extends partially into the condensate collector at the opening and defining a central aperture that receives the outlet pipe, the collector plug further having an annular flange extending radially outward from the frustoconical body to rest on the condensate collector at the opening.

C. A collector plug, comprising a body having a first end and a second end opposite the first end; an outer surface that tapers from the second end toward the first end; an annular flange extending radially outward at the second end; and a central aperture defined through the body and extending between the first and second ends.

Each of embodiments A, B, and C may have one or more of the following additional elements in any combination: Element 1: wherein the collector plug comprises a first end and a second end opposite the first end; and an outer surface that tapers from the second end toward the first end and at least partially defines the frustoconical body, wherein the annular flange extends radially outward from the second end and the central aperture is defined through the frustoconical body and extends between the first and second ends. Element 2: further comprising a sealing element that at least partially seals a clearance defined between the outlet pipe and an inner wall of the central aperture. Element 3: wherein the sealing element rests on the second end of the frustoconical body. Element 4: wherein the sealing element is positioned within an annular groove defined on the inner wall of the central aperture. Element 5: further comprising a retaining ring releasably coupled to the outlet pipe to retain the collector plug on the outlet pipe. Element 6: wherein at least a portion of the collector plug is coated with a hydrophobic material. Element 7: wherein the collector plug comprises a corrosion-resistant material. Element 8: wherein the collector plug comprises a material having a melting point greater than about 300° C.

Element 9: wherein a clearance is defined between the outlet pipe and an inner wall of the central aperture, and the method further comprises at least partially sealing the clearance using a sealing element to reduce an amount of the residual vapors from escaping from the condensate collector. Element 10: wherein at least partially sealing the clearance comprises resting the sealing element on the second end of the frustoconical body to seal the clearance. Element 11: wherein at least partially sealing the clearance comprises positioning the sealing element within an annular groove defined on the inner wall of the central aperture to seal the clearance. Element 12: further comprising retaining the collector plug on the outlet pipe using a retaining ring coupled to the outlet pipe. Element 13: further comprising preventing the liquid from sticking to the collector plug by coating the collector plug with a hydrophobic material. Element 14: wherein the collector plug comprises at least one of a corrosion-resistant material and a material having a melting point greater than about 300° C.

Element 15: further comprising an annular groove defined on an inner wall of the central aperture; and a sealing element disposed in the annular groove. Element 16: wherein at least the outer surface and the second end of the collector plug is coated with a hydrophobic material. Element 17: wherein the collector plug comprises a corrosion-resistant material. Element 18: wherein the collector plug comprises a material having a melting point greater than about 300° C.

By way of non-limiting example, exemplary combinations applicable to A, B, and C include: Element 2 with Element 3; Element 2 with Element 4; Element 9 with Element 10; and Element 9 with Element 11.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A mud retort assembly, comprising:
   a retort that heats a fluid and thereby generates vapors, the retort comprising a top chamber, a bottom chamber, and a plate separating the top chamber and the bottom chamber, the plate comprising an orifice that provides fluid communication between the top chamber and the bottom chamber;
   a condenser in fluid communication with the retort to at least partially condense the vapors and thereby generate a liquid;
   a condensate collector that receives the liquid and residual vapors via an outlet pipe of the condenser;
   a collector plug having a frustoconical body that extends at least partially into the condensate collector at an opening to the condensate collector and defining a central aperture that receives the outlet pipe, the collector plug further having an annular flange extending radially outward from the frustoconical body to rest on the condensate collector at the opening, wherein the collector plug comprises steel, brass, copper, aluminum, bronze, or alloys thereof; and
   a retaining ring releasably coupled to the outlet pipe to retain the collector plug on the outlet pipe.

2. The mud retort assembly of claim 1, wherein the collector plug comprises:
   a first end and a second end opposite the first end; and
   an outer surface that tapers from the second end toward the first end and at least partially defines the frustoconical body, wherein the annular flange extends radially outward from the second end and the central aperture is defined through the frustoconical body and extends between the first and second ends.

3. The mud retort assembly of claim 1, further comprising a sealing element that at least partially seals a clearance defined between the outlet pipe and an inner wall of the central aperture.

4. The mud retort assembly of claim 3, wherein the sealing element rests on the second end of the frustoconical body.

5. The mud retort assembly of claim 3, wherein the sealing element is positioned within an annular groove defined on the inner wall of the central aperture.

6. The mud retort assembly of claim 1, wherein the retort further comprises a heating element that is adjacent to the bottom chamber.

7. The mud retort assembly of claim 1, wherein the collector plug comprises a surface finish of about 40 microinches or less.

8. The mud retort assembly of claim 1, wherein the retort further comprises a heating element that is shaped as an open cylinder and is positioned to partially enclose the retort.

9. A method, comprising:
   heating a fluid within a retort and thereby generating vapors from the fluid, the retort comprising a top chamber, a bottom chamber, and a plate separating the top chamber and the bottom chamber, the plate comprising an orifice that provides fluid communication between the top chamber and the bottom chamber;
   condensing at least a portion of the vapors into a liquid using a condenser in fluid communication with the retort;
   receiving the liquid and any residual vapors in a condensate collector via an outlet pipe of the condenser; and
   mitigating escape of the residual vapors from the condensate collector with a collector plug positioned at an opening to the condensate collector, the collector plug having a frustoconical body that extends partially into the condensate collector at the opening and defining a central aperture that receives the outlet pipe, the collector plug further having an annular flange extending radially outward from the frustoconical body to rest on the condensate collector at the opening, wherein the collector plug comprises steel, brass, copper, aluminum, bronze, or alloys thereof.

10. The method of claim 9, wherein a clearance is defined between the outlet pipe and an inner wall of the central aperture, and the method further comprises at least partially sealing the clearance using a sealing element to reduce an amount of the residual vapors from escaping from the condensate collector.

11. The method of claim 10, wherein at least partially sealing the clearance comprises resting the sealing element on the second end of the frustoconical body to seal the clearance.

12. The method of claim 10, wherein at least partially sealing the clearance comprises positioning the sealing element within an annular groove defined on the inner wall of the central aperture to seal the clearance.

13. The method of claim 9, further comprising retaining the collector plug on the outlet pipe using a retaining ring releasably coupled to the outlet pipe.

14. The method of claim 9, further comprising preventing the liquid from sticking to the collector plug by coating the collector plug with a hydrophobic material.

15. The method of claim 9, wherein the collector plug comprises at least one of a non-corrosive material and a material having a melting point greater than about 300° C.

* * * * *